United States Patent [19]

Netherton et al.

[11] 4,403,060

[45] Sep. 6, 1983

[54] PLASTIC COLORED WITH TRANSPARENT IRON OXIDE SPINELS

[75] Inventors: Lowell E. Netherton, Summit, N.J.; Arvind S. Patil, Wyoming, Mich.

[73] Assignee: BASF Wyandotte Corporation, Wyandotte, Mich.

[21] Appl. No.: 295,346

[22] Filed: Aug. 24, 1981

Related U.S. Application Data

[63] Continuation-in-part of Ser. No. 115,309, Jan. 25, 1980, Pat. No. 4,292,294, and Ser. No. 144,735, Apr. 28, 1980, Pat. No. 4,289,745, each is a continuation-in-part of Ser. No. 37,567, May 9, 1979, abandoned, and Ser. No. 70,196, Aug. 27, 1979, abandoned.

[51] Int. Cl.$^3$ ............................................. C08K 3/10
[52] U.S. Cl. .................................. 524/413; 524/434; 524/435
[58] Field of Search ............... 524/413, 435, 434, 436, 524/437

[56] References Cited

U.S. PATENT DOCUMENTS 3,959,208  5/1976  Baskin ............................. 524/435
4,002,592  1/1977  Baskin ............................. 524/435
4,292,294  9/1981  Patil et al. ......................... 423/594

OTHER PUBLICATIONS

Murray: Pigmentation of Colored Plastics, *Pigment Handbook*, vol. II, pp. 277-285, John Wiley & Sons, 1973.

*Primary Examiner*—Lewis T. Jacobs
*Attorney, Agent, or Firm*—David L. Hedden; Joseph D. Michaels

[57] ABSTRACT

The subject invention relates to the use of certain iron oxide spinels to color plastics. The iron oxide spinels are acicular particles having an average length of less than 0.1 micron and are represented by the formulae $XFe_2O_4$ or $YFe_5O_8$ in which X is a metal selected from the group consisting of Zn, Sn, Cu, Ca, Cd, Co, Ba, Sr, Mg, Al, and Mn, and Y is Li. The spinels are incorporated into plastics by methods which are known to those of ordinary skill in the art. The resulting plastics can be made with a wide variety of colors and can be used to coat surfaces without hiding the underlying surface.

6 Claims, No Drawings

PLASTIC COLORED WITH TRANSPARENT IRON OXIDE SPINELS

CROSS-REFERENCE TO RELATED APPLICATIONS

This application is in part a continuation of the applicants' copending applications Ser. No. 115,309 filed Jan. 25, 1980 U.S. Pat. No. 4,292,294, issued Sept. 29, 1981, and Ser. No. 144,735 filed Apr. 28, 1980 U.S. Pat. No. 4,289,745, issued Sept. 15, 1981, which are in turn a continuation-in-part of Ser. No. 37,567, filed May 9, 1979, now abandoned and Ser. No. 70,196, filed Aug. 27, 1979, now abandoned, respectively.

BACKGROUND OF THE INVENTION

1. Field of the Invention

The present invention relates to a process for coloring plastics and the plastics prepared thereby. More particularly, the present invention concerns the use of iron oxide spinels which are stable at high temperatures to color plastics.

2. Prior Art

As is known to those skilled in the art to which the present invention pertains, most inorganic pigments are not suitable for plastics processing because of their thermal instability at temperatures above 175° C. Thus, the known yellow pigments such as iron oxide, lead chromate and zinc chromate are not well chosen for the yellow coloring of plastics such as polyethylene, polypropylene, polyvinyl chloride, polycarbonates, polyamide and the like. The same is true of other inorganic pigments for obtaining other colors. Furthermore, organic pigments show color degradation at temperatures of about 175° C., thereby precluding their use in the processing of plastics. Thus the need for pigments stable at high temperatures and capable of giving various desired colors is readily apparent.

Applicants' copending applications referred to above and which are incorporated by reference into this application, describe a novel form a iron oxide spinels. There was previously no method known of producing the subject spinels. The spinels are useful in coloring plastics because they are acicular particles having an average length of less than 0.1 micron and are stable at high temperatures.

SUMMARY OF THE INVENTION

The subject invention relates to the use of certain iron oxide spinels to color plastics. The iron oxide spinels are acicular particles having an average length of 0.1 micron and are represented by the formulae $XFe_2O_4$ or $YFe_5O_8$ in which X is a metal selected from the group consisting of Zn, Sn, Cu, Ca, Cd, Co, Ba, Sr, Mg, Al, and Mn, and Y is Li. The spinels are incorporated into plastics by methods which are known to those of ordinary skill in the art. The resulting plastics can be made with a wide variety of colors and can be used to coat surfaces without hiding the underlying surface. They are also transparent because the average size (less than 0.1 micron) of the pigment particles is less than the wavelength of visible light.

DESCRIPTION OF THE PREFERRED EMBODIMENT

The method for making the spinels which are used to color plastics will first be described. Thereafter, the method for incorporating the spinels into plastics will be described.

The spinels are prepared by mixing a soluble ferrous salt, and a soluble salt of a non-ferrous metal selected from the group consisting of zinc, tin, copper, calcium, cadmium, cobalt, barium, strontium, magnesium, aluminum, manganese, and lithium in water. The ferrous salt and non-ferrous salt are present in the solution in proportions such that the respective quantities of iron and other metal which are present will yield, when the solution is so adjusted in pH as to cause precipitation, the formation of a substantial quantity of a precipitate oxidizable to a spinel of the formula $XFe_2O_4$ or $YFe_5O_8$ in which X is a metal selected from the group consisting of Zn, Sn, Cu, Ca, Cd, Co, Ba, Sr, Mg, Al, and Mn and Y is Li. This mixture is then mixed with an aqueous solution containing a substantial proportion of a soluble alkalizing compound selected from the group consisting of the carbonates, bicarbonates, and hydroxides of the alkali metals. The precipitate is then oxidized to form a spinel in aqueous solution. The solution is then heated to a temperature of from about 75° C. to 100° C. and the spinel is recovered.

Although hydrated metal nitrates and hydrated ferrous sulfate work particularly well as the non-ferrous and ferrous salt, those skilled in the art will appreciate that it may in certain instances be possible to achieve the desired results with other equivalent materials which will suggest themselves to those skilled in the art. The use of hydrated salts is in general to be preferred, because such salts usually can be dissolved in water somewhat more quickly, other things being equal, than their anhydrous counterparts. After an aqueous solution of a desired strength has been obtained, it makes no difference whether the salt was or was not originally in the hydrated form. Various other soluble anions may sometimes be used in place of nitrate, such as chloride or sulfate.

Suitable beams or solutions thereof are alkali-metal bases such as the sodium or potassium carbonates, hydroxides, bicarbonates and the like. A particularly preferred base is sodium carbonate. Generally, a stoichiometric equivalent of base is employed. To be more specific, this means the use of one mole of sodium carbonate (or its equivalent, such as two moles of sodium bicarbonate) for each mole of, for example, hydrated ferrous sulfate and metal salt.

The use of a stoichiometric quantity of sodium carbonate or the like is usually to be preferred, but satisfactory results can be obtained in some cases whether the quantities used are in a stoichiometric relation or not. By "satisfactory results", we mean obtaining by reaction in an aqueous medium an appreciable yield of a fine-particle spinel having a desired composition and good high-temperature stability. If the departure from the quantities dictated by stoichiometry is not too great, an appreciable yield of the desired spinel can be obtained, even though the process is operated somewhat wastefully in respect to its use of carbonate or of metal salt. It is necessary to use at least enough of sodium carbonate to precipitate both the iron and a substantial proportion of the other metal, such as cobalt.

In the practice of the present invention, obtaining particles of the desired size is an important consideration. The particle size is in part dependent upon the degree of dilution of the reactant solutions employed, the use of solutions more dilute yields particles of finer size, other things being equal.

Oxidation can be performed in any suitable manner. One way is aeration (spraying the suspension-containing solution into air from a perforated pipe). Another is bubbling air or a mixture of oxygen and inert gas through the suspension-containing solution. Another is shaking the suspension-containing solution in a vessel along with air or a mixture of oxygen and an inert or unreactive gas. Still another possibility is the use of a suitable chemical oxidizing agent, such as hydrogen peroxide or any of a number of chemical oxidants which can provide oxygen but will not (as potassium permanganate or sodium dichromate would) tend to impart any color to the solution. The oxidation action which is required is one that is not practical to obtain by allowing the solution to stand while exposed to air or an atmosphere of oxygen. Titration can be used to monitor the progress of the oxidation.

The solution is then heated to a temperature of from about 75° C. to about 100° C. It is desirable to maintain the high temperature for a time long enough to "set the crystal", i.e., ensure the development of desired crystalline forms in the product. X-ray diffraction tests can be used to monitor the progress and ensure the completion of the development of the desired crystalline forms. The spinel is then recovered by conventional filtration and washing techniques.

The spinel thus obtained has a very fine particle size. The spinel particles are of acicular (needle-like) shape of an average length of less than 0.1 micron. The performance of pigments containing the spinel particles is dependent upon their having particles of the size indicated. In general, a calcination process for obtaining spinels results in particles substantially larger than those obtained with the present invention. Fine particles made according to the present invention give purer colors than larger particles, made by calcination process, do.

That the products are spinels has been confirmed by X-ray diffraction tests. The same materials exhibit an absence of the characteristic endotherm in differential thermal analysis at a temperature around 260° C. to 277° C. Such endotherm is characteristic of phase transformation of yellow $\alpha$-FeOOH to red $Fe_2O_3$. This means that the materials are spinels and are not $\alpha$-FeOOH.

The colors which are produced in the resulting spinel, when the various metals mentioned are used, are dependent upon the metal chosen, as will be indicated in the following Table.

TABLE

| Identity of Nonferrous Metal | Color of Spinel |
|---|---|
| Zn, Mg, Sn, Al | Yellow |
| Co | Dark Brown |
| Cu | Reddish Yellow |
| Mn | Reddish Brown |
| Ba | Orange |
| Ca | Orange with Red Cast |
| Cd | Yellow |
| Li | Reddish Brown |
| Sr | Orange with Brown Cast |

The methods for incorporating the spinel pigments into plastics are known to those skilled in the art. The necessary proportions, procedures, and equivalent do not require explanation. Detailed processes are described in references such as thos by Patton, *Pigment Handbook*, Vol. II, pages 277–285 (John Wiley & Sons, New York, 1973) and Ahmed, *Coloring Plastics* (Van Nostrand Reinhold Co., New York, 1979) which are hereby incorporated by reference into this application.

For purposes of this invention, a plastic is defined as a synthetic polymer combined with other ingredients such as curatives, fillers, reinforcing agents, colorants, and plasticizers, which can be extruded as sheets or pipes, painted onto surfaces, or molded to form objects. The term includes plastics which are thermosetting and thermoplastic. Specific examples of synthetic polymers used to prepare plastics include polyethylene, polypropylene polyvinyl chloride, polycarbonate, nylon, acrylic polymers, and polyester alkyd polymers.

When plastics have incorporated in them the submicron-sized spinel particles made according to the invention, the plastics are provided with a desired color without losing their transparency or translucency. Thus, in effect, the plastic is provided with color as if it had been dyed, but the effect is more temperature-stable than that obtained with any known dye.

Following are specific examples illustrating the principles of the present invention. These examples are to be construed as illustrative, and not limitative, of the present invention. In the examples, all parts are by weight, absent indications to the contrary. Examples I–XIII illustrate how the spinels are prepared. Examples XIV–XVI illustrate how the spinels are incorporated into plastics.

EXAMPLE I

Into a suitable reaction vessel equipped with titration means, cooling means, aeration means and agitation means, there was added a three liter solution of 27.8 grams per liter (gpl) of $FeSO_4.7H_2O$ and 17 gpl $Mg(NO_3)_2.6H_2O$. With stirring, 200 milliliters of 231 gpl $Na_2CO_3$ solution was added thereto. The temperature in the vessel at the time of carbonate addition was 19° C. With stirring, a precipitate is formed in the flask.

After precipitation ceased, air was bubbled into the flask via the aeration means. Contemporaneous with aeration, the oxidation of the ferrous sulfate was monitored by titration with potassium permanganate.

After aeration was completed, the precipitation solution was heated to 90° C. and maintained thereat for two hours, then cooled to room temperature. The precipitate was then recovered by filtration of the solution. The precipitate was then washed and dried. A temperature-stable yellow pigment was thus obtained. In other words, the pigment displayed, upon being subjected to differential thermal analysis, an absence of the transformation from goethite to hematite of the kind discussed herein above.

EXAMPLE II

Example I was repeated using an iron-metal solution of 27.8 gpl $FeSO_4.7H_2O$ and 19.8 gpl $Zn(NO_3)_2.6H_2O$, to which was added 46 gms of $Na_2CO_3$ solution. A yellow pigment which was temperature-stable was obtained.

EXAMPLE III

A solution containing 67 lbs. (30.4 kg.) of ferrous sulfate heptahydrate and 47 lbs. (21.3 kg.) of $Zn(NO_3)_2.6H_2O$ was prepared in 150 gallons (567.8 liters) of water maintained at 20° C. To this solution was added a solution of 37 lbs. (16.8 kg.) of $Na_2CO_3$ dissolved in 19.3 gallons (73 liters) of water. The reaction mixture was aerated at 3 cubic feet per minute (84.9 liters per minute) of air until maximum oxidation of the ferrous ion occurred, as determined by potassium permanganate titration. The reaction mixture was then heated to 90° C., filtered, washed and dried. A temperature-stable yellow pigment was thus obtained.

EXAMPLE IV

Example III was repeated except that 46 lbs. (20.9 kg.) of zinc sulfate heptahydrate were used in place of the indicate quantity of zinc nitrate hexahydrate. Once again, a temperature-stable yellow pigment was thus obtained.

EXAMPLE V

Samples of each of the pigments of Examples I–IV hereof were heated for ½ hour at 280° C. in an oven. Each sample remained yellow in color.

EXAMPLE VI

Into a suitable reaction vessel equipped with titration means, cooling means, aeration means, and agitation means, there was added a 3-liter solution of 27.8 grams per liter of $FeSO_4.7H_2O$ and 15.9 grams per liter of $CoCl_2.6H_2O$. With stirring, 100 milliliters of water having 46.2 grams of sodium carbonate dissolved therein was added. The temperature in the vessel at the time of carbonate addition was approximately 12° C. The solution containing $CoCl_2$ and $FeSO_4$ was wine red, and upon the addition of the sodium carbonate solution, the reaction mixture turned milky purple.

Air was bubbled into the reaction vessel via the aeration means for a period of four hours, the color of the reaction mixture turning black-green. After the aeration was completed, the precipitated solution was heated at 90° C. and maintained thereat for one hour, then cooled to room temperature. The color of the reaction mixture remained the same during the heating step. The precipitate was then recovered by filtration of the solution, and washed and dried. The product iron-cobalt spinel was dark brown in color. A temperature-stable pigment consisting of submicron-sized particles of spinel was obtained.

EXAMPLE VII

Example VI was repeated, using as an iron-metal solution one that contained 27.8 grams per liter of $FeSO_4.7H_2O$ and 10.8 grams per liter of $CuSO_4$. The initial solution containing iron and copper ions was bright blue. After the addition of sodium carbonate, the solution turned olive green. After four hours of oxidation, the reaction mixture turned yellow and held at that color through the subsequent heating step. A product which was yellow with a red shade was obtained.

EXAMPLE VIII

Example VI was repeated, using an iron-metal solution containing 27.8 grams per liter of $FeSO_4.7H_2O$ and 11.3 grams per liter of $MnSO_4.H_2O$. Upon addition of the sodium carbonate solution, the reaction mixture turned powder blue. After two hours of oxidation, the color of the reaction mixture turned red-brown and held throughout the remaining oxidation and subsequent heating. A reddish-brown product was obtained.

EXAMPLE IX

Example VI was repeated, except that the iron-metal solution contained 27.8 grams per liter of $FeSO_4.7H_2O$ and 16.3 grams of $BaCl_2.2H_2O$. The initial solution was milky white. After the addition of sodium carbonate solution, the reaction mixture was powder blue. After 1.5 hours of oxidation, the reaction solution turned red-brown and held. A slightly orange product was obtained.

EXAMPLE X

Example VI was repeated, using an iron-metal solution containing 25.8 grams per liter of $FeSO_4.7H_2O$ and 17.8 grams per liter of $SrCl_2.6H_2O$. In the making of the initial solution, upon addition of the strontium chloride solution to the ferrous sulfate solution, the reaction mixture became slightly viscous and was light blue in color. Addition of the sodium carbonate solution gave a powder-blue reaction mixture. After 1.5 hours of oxidation, the color turned red-brown and held. A product was obtained that was slightly orange with a brown cast.

EXAMPLE XI

Example VI was repeated, using an iron-metal solution containing 25.8 grams per liter of $FeSO_4.7H_2O$ and 7.4 grams per liter of $CaCl_2$. The initial solution was clear. On addition of the sodium carbonate solution, the reaction mixture turned powder blue, and then blue-black. After two hours of oxidation, the solution turned red-brown and held. A product was obtained which was vivid orange with a red cast.

EXAMPLE XII

Example VI was repeated, using an iron-metal solution containing 25.8 grams per liter of $FeSO_4.7H_2O$ and 20.6 grams per liter of $Cd(NO_3)_2.4H_2O$. On addition of the sodium carbonate solution, the reaction mixture turned a light powder blue. After one hour of oxidation, the color was light yellow.

EXAMPLE XIII

Example VI was repeated, using an iron-metal solution containing 25.8 grams per liter of $FeSO_4.7H_2O$ and 2.8 grams per liter of $LiCl$. On addition of the sodium carbonate solution, the reaction mixture was powder blue. After 1.5 hours of oxidation, the color turned dark red-brown and held. A product which was deep red-brown was obtained.

EXAMPLE XIV

Forty percent by weight of high temperature stable yellow pigment containing zinc (prepared in accordance with Example III) was physically mixed with acrylic resin DM-54 (manufactured by Rohm & Haas). The rolls of a two-roll mill were pre-conditioned at 250°–285° F. and the gap between the rolls was set at 10–15 mm. The above pigment-acrylic resin mixture was put on the rotating two rolls to flux the resin and to obtain an intimate dispersion of pigment for a period of 10 minutes. The yellow colored resin mixture was then taken off the rolls and allowed to cool to the room temperature. The ribbon of the cooled pigment-resin mixtures were then broken into smaller pieces, physically mixed and then put back on the mill and refluxed on the rotating and pre-conditioned rolls for a further 10 minutes, in order to further enhance the dispersibility of the pigment. The resultant master batch or master concentrate containing 40 percent pigment was then cooled and granulated (by extruding it into a strand at 400°–500° F. and subsequently chopping it after passing it through water).

The master concentrate containing 40 percent pigment was then let down to 0.2 percent level in Nylon 6/6, polypropylene, general purpose polystyrene (GPPP) and in poly(vinylchloride) (PVC) to evaluate the masstone. These letdowns at 0.2 percent pigment for masstone evaluation were obtained by taking the master concentrate at the rate of 0.50 gram per 100 grams resin and extruding and granulating it. Subsequently, this material was injection molded to obtain a flat and a three-step chip where the color and the transparency of the plastic material can be observed.

The temperature at which the extruder and the injection molder are operated for each type of plastic is known to those skilled in the art. But usually these temperatures are as follows:

| Plastic | Injection Molding Temp °F. | Extruding Temperature Temp °F. |
|---|---|---|
| Acrylic | 400–500 | 375–450 |
| Nylon 6/6 | 520–580 | 520–580 |
| Polypropylene | 400–550 | 400–500 |
| GPPS | 435–475 | 400–475 |
| PVC | 300–415 | 325–450 |

Examination of the injection molded chips showed that high temperature stable pigment of the subject invention was able to color the above-mentioned plastics yellow while still retaining their transparency.

For comparison, a zinc-iron spinel pigment produced by calcination, as for example taught in U.S. Pat. No. 2,904,395 (Downs and Martin) was used in all of the above plastics using identical procedures. The resultant chips showed opacification of the plastic. The color also was much redder than compared to that of the chip, pigmented with the product of this invention.

EXAMPLE XV

A master concentrate with the yellow high temperature stable pigment (prepared in accordance with Example IV) was prepared using the general procedure of Example XIV except polyethylene (U.S.I's MN-710) was used. The two rolls were conditioned at 190° F.–250° F. The extruder temperature was between 300° F.–350° F. The master batch produced with polyethylene was let down in the various plastics following the procedure of Example XIV. The resultant chips showed good yellow coloration and transparency for the plastic.

EXAMPLE XVI

A physical mixture of 40 grams of high temperature stable yellow pigment (prepared in accordance with Example IV) per 100 grams of low molecular weight powdered polyethylene wax (Epolene E-10 Wax: Mol. Wt. 3000, Eastman Kodak) was prepared. This was then ball milled with ½ inch diameter alumina balls for a period of 24 hours. Subsequently, 0.5 grams of this was mixed per 100 grams of various plastic resins mentioned in Example XIV and the mixture was extruded, granulated, dried in the oven and then injection molded to produce flat and three step chips.

These once again showed yellow coloration with good transparency.

By using procedures such as those described, it is possible to incorporate other spinels into other types of plastics. Various colors of plastics can be obtained by using different spinels. In all of the above cases, the pigments will impart color to the plastic while creating no hiding.

While certain embodiments of the invention have been described, it is intended that there be covered as well any change or modification therein which may be made without departing from the spirit and scope of the invention.

The embodiments of the invention in which an exclusive privilege or property is claimed are defined as follows:

1. In a method for making a plastic which involves incorporating a colorant into a synthetic polymer, the improvement which comprises using as the colorant a spinel in the form of acicular particles having an average length of less than 0.1 micron and which corresponds to the formulae $XFe_2O_4$ or $YFe_5O_8$ wherein X is Zn, Sn, Cu, Ca, Cd Co, Ba, Sr, Mg, Al, or Mn, and Y is Li.

2. The method of claim 1 wherein the synthetic polymer is selected from the group consisting of polyethylene, polypropylene, polyvinylchloride, polycarbonate, nylon, acrylic, and polyester alkyd.

3. A plastic having incorporated therein a spinel in the form of acicular particles having an average length of less than 0.1 micron and which corresponds to the formulae $XFe_2O_4$ or $YFe_5O_8$ wherein X is Zn, Sn, Cu, Ca, Cd, Co, Ba, Sr, Mg, Al, or Mn, and Y is Li.

4. The plastic of claim 3 wherein the plastic comprises (a) a synthetic polymer selected from the group consisting of polyethylene, polypropylene, polyvinyl chloride, polycarbonate, nylon, acrylic, and polyester alkyd, and (b) a spinel in the form of acicular particles having an average length of less than 0.1 micron and which corresponds to the formulae $XFe_2O_4$ or $YFe_5O_8$ wherein X is Zn, Sn, Cu, Ca, Cd, Co, Ba, Sr, Mg, Al, or Mn, and Y is Li.

5. The method of claim 1 wherein X is Zn.

6. The plastic of claim 3 or 4 wherein X is Zn.

* * * * *